Sept. 1, 1931.  A. B. BEITMAN  1,821,903
WINDSHIELD
Filed Aug. 19, 1929   3 Sheets-Sheet 2
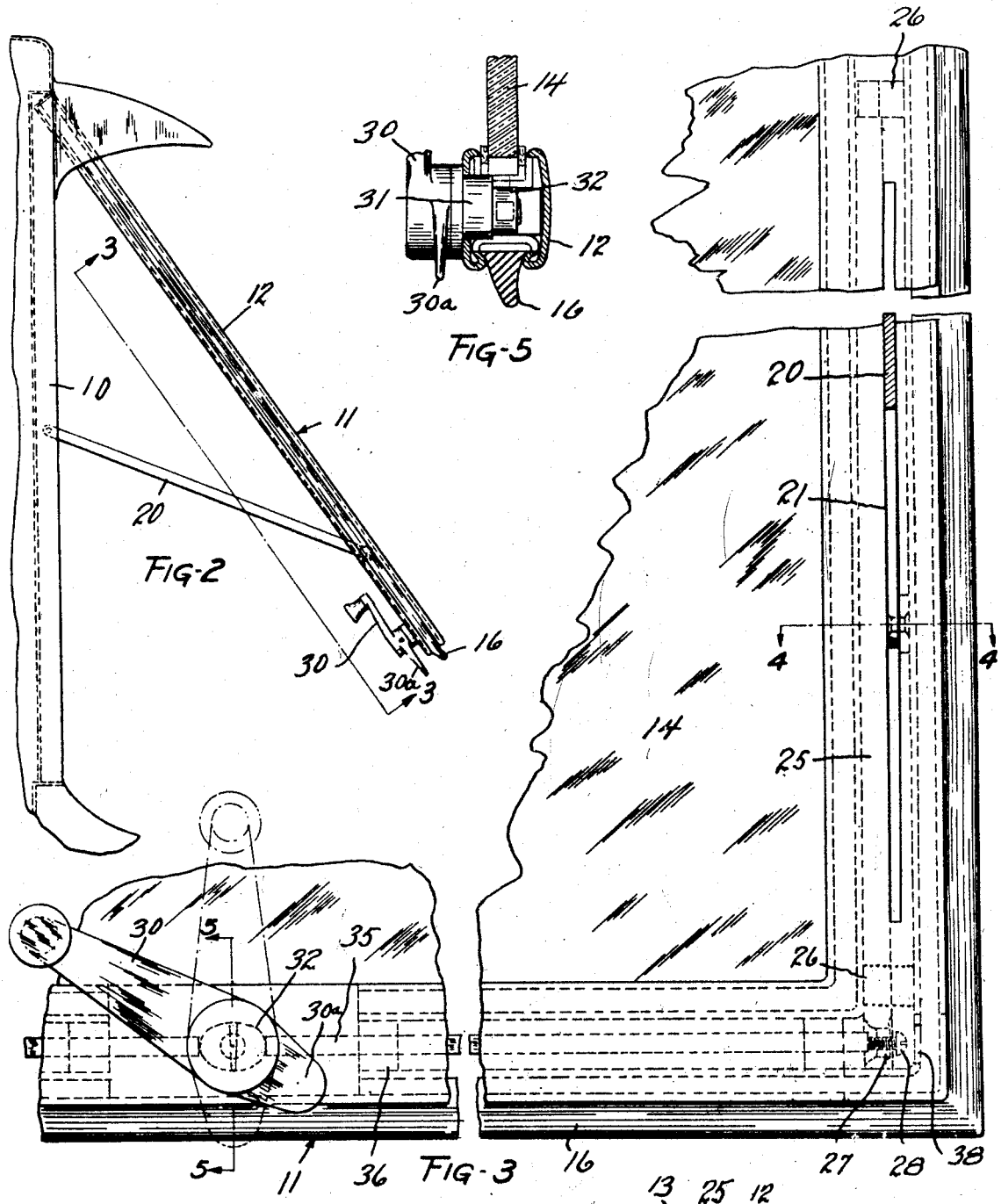

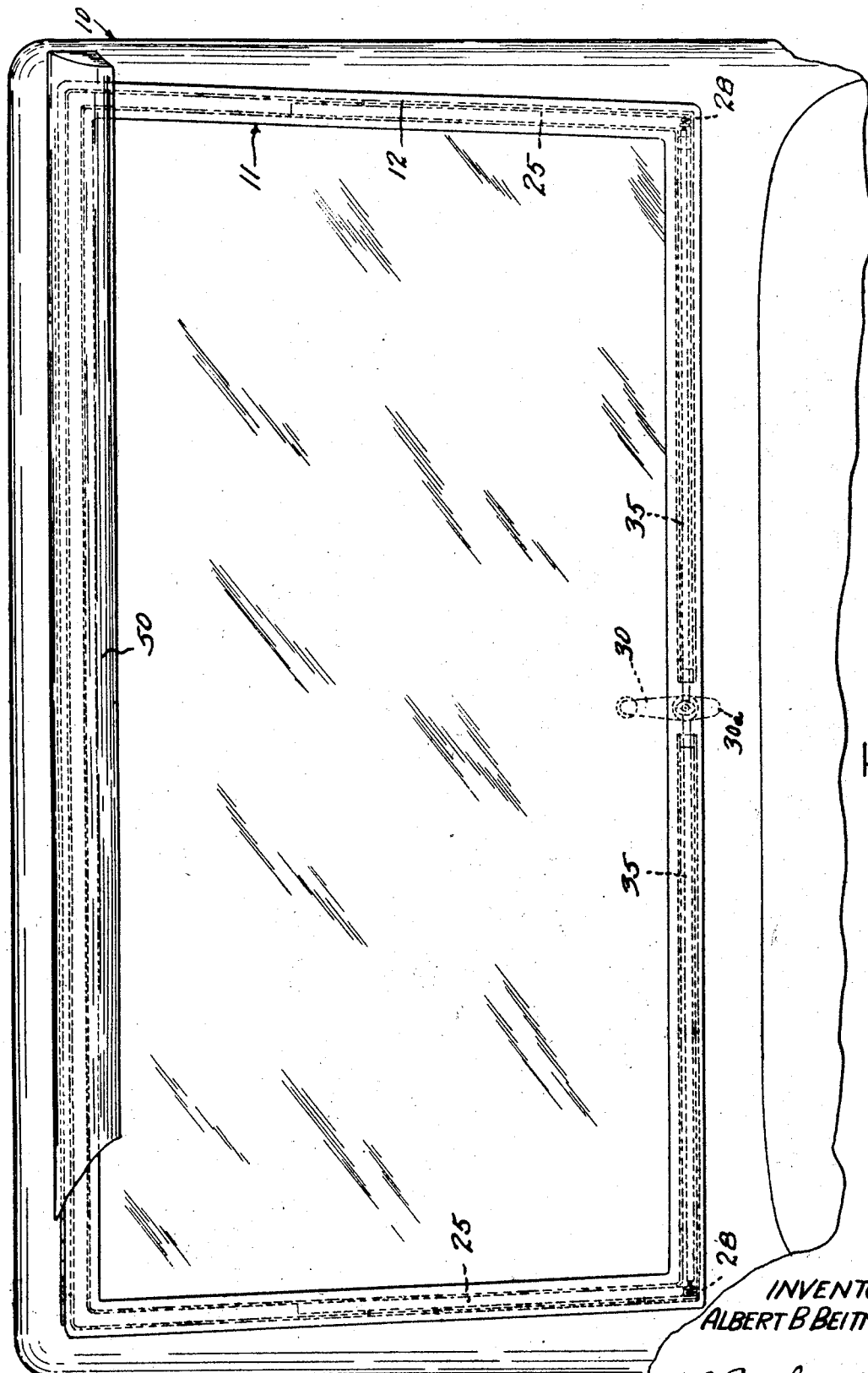

Sept. 1, 1931. A. B. BEITMAN 1,821,903
WINDSHIELD
Filed Aug. 19, 1929 3 Sheets-Sheet 3
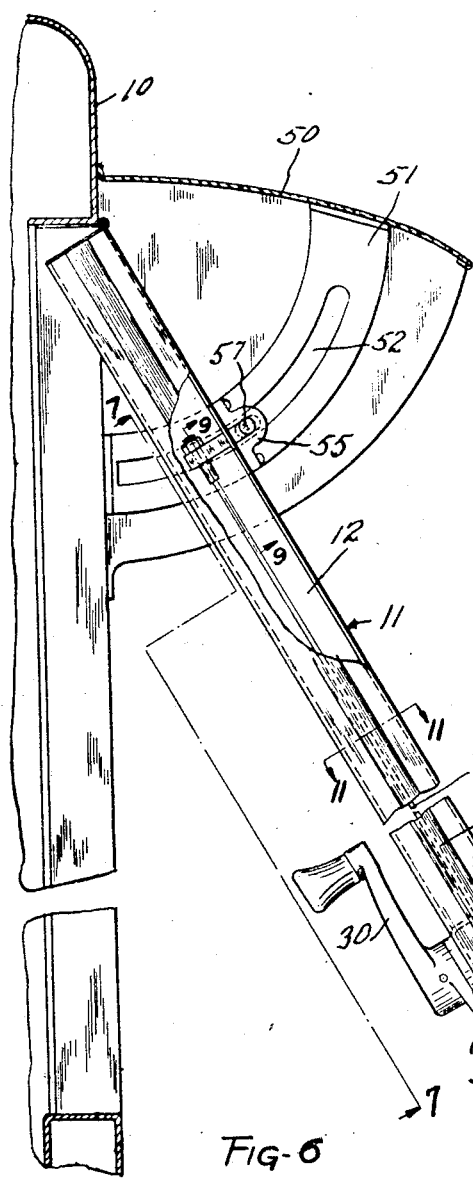
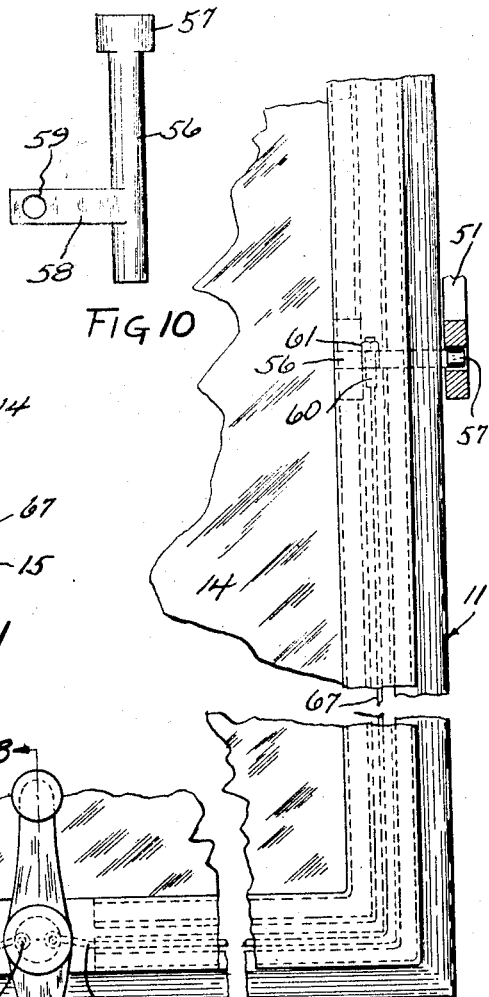
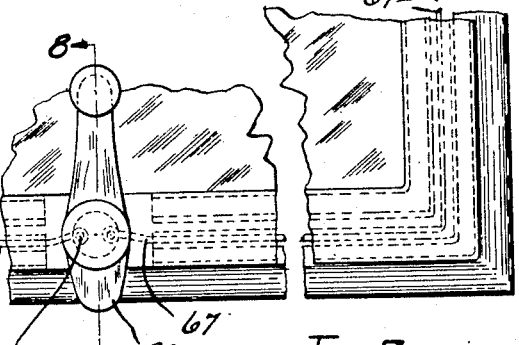
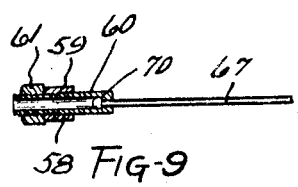
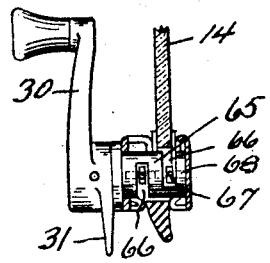
INVENTOR
ALBERT B BEITMAN
By Hull, Brock & West
ATTORNEYS Patented Sept. 1, 1931

1,821,903

UNITED STATES PATENT OFFICE

ALBERT B. BEITMAN, OF CLEVELAND HEIGHTS, OHIO

WINDSHIELD

Application filed August 19, 1929. Serial No. 386,780.

This invention relates to windshields for motor vehicles and particularly to the type of windshield which is hinged at one side to its frame to be opened and closed when desired.

The principal object of my invention is to provide means for locking the windshield in its open position as well as when closed, by a simple movement of a single lever or handle so that it is unnecessary to stop the car or take both hands from the steering wheel in making such adjustment.

A further object is to provide a rigid bracing means for the windshield when in its open positions which may be locked or released by the turn or movement of a handle or lever that is so located on the windshield that a direct thrust or pull on the lever will move the windshield to open or close the same.

A still further object is to provide a relatively inexpensive windshield adjusting device which is strong and durable and in which the parts are so constructed and arranged to preclude any objectionable rattling or chattering of such parts due to vibration of the car.

With these and such other objects in view as will be apparent from the following description the invention resides in all the novel features of construction and combination of parts disclosed and particularly set forth in the appended claims.

In the drawings which form a part of this specification Fig. 1 is a front elevation of the body of an automobile with the windshield operating mechanism shown in dotted lines; Fig. 2 is a side elevation of the windshield in open position in its frame, the rear portion of the vehicle top being broken away; Fig. 3 is an enlarged fragmental rear elevation of one side and bottom of the windshield, the brace bar being shown in section; Fig. 3ª is a detail in perspective of parts of the locking mechanism; Figs. 4 and 5 are detail sectional views taken on the lines 4—4 and 5—5 of Fig. 3 respectively; Fig. 6 is a vertical section through the windshield frame, the windshield being shown in end elevation, illustrating a modified form of adjusting mechanism; Fig. 7 is a fragmental rear elevation of one side and bottom portion of the windshield shown in Fig. 6; Fig. 8 is a sectional view taken on the line 8—8 of Fig. 7; Figs. 9 and 11 are sectional views taken on the line 9—9 and 11—11 of Fig. 6 and Fig. 10 is a plan view of the cam member used in the form of device illustrated in Figs. 6 to 11 inclusive.

In describing my invention reference is made to the accompanying drawings in which like reference numerals are used to designate like parts in the several views, and in which the reference numeral 10 designates generally the outer stationary frame for a windshield, the frame constituting the front part of the top of an automotive vehicle. Within the frame there is hinged in the usual manner the windshield 11, which windshield may be of any partitcular shape desired.

The windshield 11 is made up of an outer hollow metallic frame or sash 12 channeled as at 13 to receive the pane of glass 14. About the three free edges the windshield is provided with a channel 15 in which is received a rubber gasket or sealing member 16 that contacts with the frame member 10 to form a waterproof joint between the sash 12 and frame 10 when the windshield is closed.

My preferred form of windshield adjusting and securing mechanism which is disclosed in Figs. 1 to 5 inclusive includes a pair of brace members, one being shown in each of Figs. 2 and 3, where it is designated 20. Each brace member has one of its ends hinged to one side of the frame member 10 while its opposite end is extended into a slot 21 provided in the back face of the corresponding end portion of the sash 12. To the inner end of each of the brace members 20 is secured a slide member 22 which is slidably received in the vertical ends of the sash, the slide members providing a bearing and guide for the braces 20 and also serve to hold the braces in the slots 21. Extending vertically within the channel end members of the sash 12 adjacent to and parallel with the slots 21 are cam shaped clamping members 25 each journaled at its upper and lower ends in suitable bearings 26. At the lower end each cam member 25 is provided with an integral extension 27 which extends at right angles to the length of the cam (see Fig. 3a). Threaded through a suitable aperture in the outer end of each extension 27 is a screw 28.

A handle or crank member 30 located at the center of the lower edge of the sash 12 is secured to the outer end of a shaft 31 which extends into the hollow part of the sash. Within the sash the shaft 31 is provided with a cam shaped portion 32 against which the inner ends of slidable rods 35 bear, the rods 35 being longitudinally slidable in bearings 36 provided within the hollow sash and so positioned that the outer end of each rod engages the screw 28 which passes through the extension 27 of the upright cam member.

It will be apparent that in swinging the windshield 11 in its frame 10 the outer ends of the brace bars 20 will move up and down in slots 21. By turning the crank or handle member 30 the cam 32 forces the rods 35 outwardly against the inner end of the screws 28 rotating the upright cam members 25 in their bearings so that they engage the inner ends of the brace rods 20 binding them tightly in any desired position to which the windshield has been moved. The parts are so adjusted, through the medium of the screws 28, that the brace rods 20 will be firmly clamped against movement when the cam 32 is turned so that its major axis is substantially in alignment with the longitudinal axes of the rods 35, thus effecting a locking of the parts in holding position. As soon as the cam is shifted from this position, however, all parts become released and the sash may be swung freely.

To provide a positive lock for the windshield when it is in its closed position the handle member 30 is provided with an extension 30a which when the handle is turned in the vertical position will engage the inner edge of the windshield frame 10 or a suitable bearing plate which may be provided.

The handle 30 it will be noted is used both as a handle to grasp in pushing or pulling the windshield open or closed and that by only a slight twist of the handle the cam members 25 are moved into or out of engagement with the sliding brace rods 20. With only a slight movement of the cams 25 the inner ends of the brace rods 20 are clamped firmly in the channel of the windshield frame 12 so that there can be no rattling or chattering of the parts due to the vibration of the car. At each lower corner of the windshield in alignment with the screws 28 the sash 12 is provided with openings 38 through which a screw driver may be inserted to adjust screws 28 whereby adjustment may be made to take care of any wear of the rods 35 on the cam 32 or any wear of the vertical cam members 25 against the inner ends of the brace rods 20.

In Figs. 6 to 11 inclusive I have illustrated a modified form of windshield adjusting and locking mechanism which may be operated by a single handle or lever member 30 positioned at the central lower portion of the windshield. In this form the front frame portion of the vehicle top is provided with the usual visor 50 and within each end of the visor there is mounted an arcuate bracket member 51 provided with an arcuate slot 52 formed concentric with the hinge of the windshield. At each end the sash 12 of the windshield is provided with a bearing member 55 in which a shaft 56 is journaled. The outer end 57 of the shaft is cam shaped which cam portion is positioned to ride freely in the arcuate slot 52 in the bracket. On the inner end the shaft 56 is provided with an extension 58 extending at right angles therefrom and into the channel or hollow portion of the sash 12. The free end of the extension 58 is provided with an aperture 59 in which a tubular member 60 fits, the outer end of the tubular member being threaded to receive a nut 61. The handle or lever 30 journaled at the lower central portion of the sash 12 is provided with the extension 31 which constitutes a lock for the windshield when in its closed position the same as in the form illustrated in Figs. 1 to 5. Within the hollow of the sash 12 the shaft 65, to the outer end of which the handle 30 is secured is provided with oppositely disposed slots 66 in which the inner ends of wire cables or the like 67 are secured by means of pins 68, the pins 68 being positioned eccentric with respect to the axis of rotation of the shaft 65.

The sash 12 of the windshield is provided around its lower edge and ends with the channel 15 in which the upper gasket member 16 fits. In the bottom wall of the channel 15 there is provided a groove 69 in which the wire cable 67 is slidably received. The outer ends of the wire cables 67 are secured in the tubular members 60 in any suitable manner such as by enlarging the end of the wire to engage a constricted portion 70 in the tubular member as shown in Fig. 9. It will be apparent that by partial rotation of the handle 30 the wire cable members which are secured to the pins 68 as illustrated in Fig. 7, are tightened thereby pulling downward on the lever 58 of the shaft 56, twisting the cam portions 57 in the slots 52 with a binding action whereby the windshield is securely held in any desired open position. This result is assured by providing sufficient friction in the bearing of the shaft 65 and proportioning the parts so that the pins 68 to which the wires or cables 67 are attached, and which are in effect cranks, will be substantially on "dead center", so to speak, when the mechanism is in holding condition. By adjusting the nut 61 on the tubular member 60 any stretch of the wire or wear of the cam portion 57 in the slot 52 may be taken up.

By providing the groove 69 in the manner illustrated in which the wires 67 fit it is only necessary to remove the rubber weather strip 16 to have free access to the wire to repair or replace the same. In practice, the portions of the grooves (through which the wires or cables 67 play) adjacent the corners of the sash should be sufficiently rounded and of ample radius to avoid undue strain and friction on the wires or cables.

In this form of device the lever 30 again serves as the handle to be grasped in pushing or pulling the windshield open or closed and by a partial turn of the same the windshield may be locked in any desired position or released from such position, so that it is necessary to use only one hand in manipulating the windshield. Since the cable member 67 fits snugly within its channel 69 and the cam member 56 is journaled in the bearing 55 closely fitting the same, there are no parts free to rattle under the vibration of the car.

It will be apparent of course that the brackets 51 may be separate from the visor member 50 or the slot 52 may be formed in the ends of the visor itself.

While I have illustrated only two forms of windshield adjusting mechanism it is obvious that various changes may be made in the construction of the same without departing from the spirit of the invention or the scope of the appended claims.

Having thus described my invention, what I claims is:—

1. In combination with the windshield frame of a vehicle, a windshield pivotally mounted therein, supporting arms extending from said frame member clamping means for engaging the arms to hold the windshield in various open positions, a single handle member, a connection between the handle member and the clamping means, said connection and clamping means being incorporated within the windshield frame for securing said arms to hold the windshield in various open positions, said connection for the clamping means and said handle being movable with the shield.

2. In combination with the windshield frame of a vehicle, a windshield sash pivotally mounted therein and being provided with hollow parts, a supporting arm extending from the frame at each end of the windshield for supporting the weight of said shield when in open positions, holding means housed within the hollow parts for engaging said arms to hold the windshield in various open positions, an operating member secured to the shield, and a connection between said operating member and said holding means housed within said hollow parts and movable with the shield for causing the holding means to securely engage the supporting arms to thereby clamp said shield in fixed relation to the frame.

3. In combination with the windshield frame of a vehicle, a windshield sash pivotally mounted therein, the sash incorporating hollow parts, supporting arms for sustaining the weight of the shield in its various open positions extending from said frame, holding means housed within the hollow parts of the sash and concealed from view thereby and arranged to engage said arms for locking the windshield in any desired position of adjustment, a handle member operatively connected with the sash, and a connection between the handle member and the holding member whereby actuation of the handle member causes said holding member to be brought into tight engagement with the said arms.

4. In combination with the windshield frame of a vehicle, a windshield pivotally mounted therein, supporting arms extending from said frame member, cam members mounted on said windshield and arranged to engage said arms, a single handle pivotally mounted to the windshield, a connection between the handle and said cam members, eccentric means on said pivoted handle, for actuating said connection for forcing the cams into tight engagement with said arms, whereby with only a partial revolution of the handle the windshield may be locked in any desired open position.

5. In combination with the windshield frame of a vehicle, a windshield pivotally mounted therein, supporting arms extending from said frame member, cam members mounted on said windshield and arranged to engage said arms, a single handle pivotally mounted to the windshield, a connection between said handle and cam members, eccentric means on said pivoted handle for actuating said connection for forcing the cams into tight engagement with said arms, whereby with only a partial revolution of the handle the windshield may be locked in any desired open position, and means on said handle adapted to engage said frame for locking the windshield in its closed position.

6. In combination with the windshield frame of a vehicle, a windshield pivotally mounted therein, supporting arms extending from said frame member, a handle member on said windshield adjacent the free edge thereof to be grasped in swinging the same open or closed, and means incorporated in the windshield frame and operated by said handle and cooperating with said arms for locking the windshield in any desired open position, said handle and said means being movable with the windshield in its various positions of adjustment.

7. In combination with the windshield frame of a vehicle, a windshield pivotally mounted therein, brace members pivotally connected to said frame one at each end of said windshield, said windshield having a slot at each end in which said brace members are slidably received, means on said windshield for engaging said brace members to hold them in any desired position of adjustment in said slots, a single operating member on said windshield, and a connection between the single operating member and said means whereby actuation of the single operating member moves said means into engagement with said brace members.

8. In combination with the windshield frame of a vehicle, a windshield pivotally mounted therein, brace members pivotally connected to said frame one at each end of said windshield, said windshield having a slot at each end in which the corresponding one of said brace members is slidably received, a handle member mounted on said windshield, holding means, and a connection between said handle member and said holding means for securing the holding means to the brace members in any desired position in said slots whereby the windshield may be held in any desired position.

9. In combination with the windshield frame of a vehicle, a windshield pivotally mounted therein, brace members pivotally connected to said frame one at each end of said windshield, said windshield having a slot at each end in which the corresponding one of said brace members is slidably received, holding means arranged within the windshield adjacent said slots, a single handle member on said windshield, a connection between said handle member and said holding means to actuate the latter to cause the same to hold the brace members tightly in said slots whereby the windshield may be held in any desired open position.

10. In combination with the windshield frame of a vehicle, a windshield pivotally mounted therein, brace members pivotally connected to said frame one at each end of said windshield, said windshield having a slot at each end in which the corresponding one of said brace members is slidably received, a cam member pivoted within the windshield frame adjacent each of said slots for engaging said brace members, and a single handle, a connection between said single handle member and said cams for moving them into engagement with said brace members whereby the windshield may be opened or closed and locked in any desired position by the use of only one hand.

11. In combination with the windshield frame of a vehicle, a windshield pivotally mounted therein and having a channeled sash, the end members of said sash having longitudinally extending slots therein, brace members pivoted at one end to said frame, the opposite end of the brace member at each end of the windshield being received in the corresponding slot in said sash to slide longitudinally of said slot, means arranged adjacent each slot for engaging said brace member to hold it in various adjusted positions therein, and a single handle member, and a connection between said handle member and said means adjacent the slots for engaging the brace member for operating the latter, upon actuation of the handle member, whereby to secure the shield in a selected position of adjustment.

12. In combination with the windshield frame of a vehicle, a windshield pivotally mounted therein and having a channeled sash, the end members of said sash having longitudinally extending slots therein, brace members pivoted at one end to said frame, the opposite end of the brace member at each end of the windshield being received in the corresponding slot in said sash to slide longitudinally of said slot, cams pivotally mounted adjacent said slots for engaging said brace members, a handle member, a connection between said handle member and said cams whereby actuation of the handle member causes the cams to bind said brace members in said sash to hold the windshield in various positions.

13. In combination with the windshield frame of a vehicle, a windshield pivotally mounted therein and having a channeled sash, the end members of said sash having longitudinally extending slots therein, brace members pivoted at one end to said frame, the opposite end of the brace member at each end of the windshield being received in the corresponding slot in said sash to slide longitudinally of said slot, cams pivotally mounted adjacent said slots for engaging said brace members, a handle member on said windshield, a connection between said handle and said cams whereby they may be caused to bind said brace members in said sash to hold the windshield in various positions, and means on said handle for locking the windshield in its closed position.

14. In combination with the windshield frame of a vehicle, a windshield pivotally mounted therein and having a channeled sash, the end members of said sash having longitudinally extending slots therein, brace members pivoted at one end to said frame, the opposite end of the brace member at each end of the windshield being received in the corresponding slot in said sash to slide longitudinally of said slot, a cam member extending longitudinally adjacent each slot and pivoted within the frame, an offset portion on the end of each cam member constituting a lever, a handle member rotatably mounted on the lower edge of the windshield, and means operatively connecting said handle and said offset portions of the cams whereby the cams may be rotated to securely clamp the brace members in any desired position relative to said windshield.

15. In combination with the windshield frame of a vehicle, a windshield pivotally mounted therein and having a channeled sash, the end members of said sash having longitudinally extending slots therein, brace members pivoted at one end to said frame, the opposite end of the brace member at each end of the windshield being received in the corresponding slot in said sash to slide longitudinally of said slot, a cam member extending longitudinally adjacent each slot and pivoted within the frame, an offset portion on the end of each cam member constituting a lever, a handle member rotatably mounted on the lower edge of the windshield, a cam on said handle, rods engaging the cam on said handle and the offset portions of said first mentioned cam members whereby a partial rotation of said handle causes said cam members to clamp the brace members within the windshield frame, and means for adjusting the first mentioned cam members relative to said handle.

16. The combination with a windshield frame of a motor vehicle of a horizontally pivoted windshield mounted therein adapted for upward and outward swinging movement, a handle connected with the windshield, and mounted on the inside thereof and accessible to the driver, and movable therewith in its various positions of adjustment, bracing means for supporting the windshield in its various open positions, securing means for retaining the same in its selected position of adjustment and a connection between the handle and the securing means for actuating the latter, said handle being operable by the hand of the operator to actuate the securing means.

17. The combination with a windshield frame of a motor vehicle, of a horizontally pivoted windshield mounted therein and adapted for upward and outward swinging movement, a control connected with the windshield and movable therewith in its various positions of adjustment and mounted on the inside of the windshield and accessible to the driver, bracing means for supporting the shield in its open positions, securing means cooperating with the bracing means for retaining the shield in its selected position of adjustment and for fixing it from relative movement with respect to the bracing means and a connection between the control means and the securing means for actuating the latter, said control means being secured to the shield at the lower portion thereof independently of the connection between the control means and the securing means.

18. In combination, a windshield frame of a vehicle, a windshield pivotally mounted therein, for upward and outward movement, securing means for holding the shield in selected positions of adjustment, a handle secured to said shield near the lower marginal edge thereof and movable therewith, and mounted on the inside of the windshield and accessible to the driver, a connection between said handle and the securing means, said handle being adapted to be actuated to release the securing means and thereafter employed as a handle to adjust the position of the shield with respect to the frame.

19. In combination, a windshield frame of a vehicle, a windshield swingingly mounted therein for upward and outward movement, securing means for holding the shield in its various positions of adjustment, control means secured to said windshield said control means being mounted on the inside of the windshield and accessible to the driver, a connection between the control means and the securing means for actuating the latter, said control means and connection being movable with the shield and said connection being housed to obscure it from vision.

20. In combination, a windshield frame of a motor vehicle, a windshield pivotally supported thereby for upward and outward swinging movement to various open positions, a handle secured to the windshield and movable therewith, said handle being mounted on the inside of the windshield and accessible to the driver, securing means for holding the shield in a selected position of adjustment, a connection between said handle and the securing means, and a housing provided by said windshield for obscuring the connection from view.

21. The combination with a windshield frame of a vehicle, of a horizontally pivoted windshield mounted therein and adapted for upward swinging movement, bracing means secured to the frame and having the lower end thereof slidably connected with a slot end provided by the windshield whereby the same may slide relative to the shield during the swinging movement of the shield relative to the frame, and means for clamping said bracing means when the shield has been placed in an adjusted position.

22. The combination with a windshield frame of a motor vehicle of a horizontally pivoted windshield mounted therein, a control connected with the windshield and movable therewith in its various positions of adjustment, securing means cooperating with the windshield for retaining the same in its selected position of adjustment, a connection between the control means and the securing means for actuating the latter, means associated with said control means adapted to be actuated thereby for holding the shield to the windshield frame when the shield is in closed position.

23. The combination with a windshield frame of a motor vehicle of a horizontally pivoted windshield mounted therein, a handle connected with the windshield at the lower marginal edge thereof, and movable therewith, securing means cooperating with the windshield for retaining the same in its selected position of adjustment, and a connection between the handle and the securing means for actuating the latter, said handle being provided with a projection engageable with the windshield frame to hold the shield in position.

24. In combination, a windshield frame of a vehicle, a windshield swingingly mounted therein for upward and outward movement, securing means for holding the shield in its various positions of adjustment, control means secured to said windshield, said control means being mounted on the inside of the windshield and accessible to the driver, a connection between the control means and the securing means for actuating the latter, said control means and connections being movable with the shield.

In testimony whereof I hereunto affix my signature.

ALBERT B. BEITMAN.